(12) United States Patent
Ge et al.

(10) Patent No.: US 11,915,685 B2
(45) Date of Patent: *Feb. 27, 2024

(54) SEMI-SORTED BATCHING WITH VARIABLE LENGTH INPUT FOR EFFICIENT TRAINING

(71) Applicant: Sony Interactive Entertainment Inc., Tokyo (JP)

(72) Inventors: Zhenhao Ge, Plano, TX (US); Lakshmish Kaushik, San Jose, CA (US); Saket Kumar, Fremont, CA (US); Masanori Omote, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/189,145

(22) Filed: Mar. 23, 2023

(65) Prior Publication Data
US 2023/0326452 A1 Oct. 12, 2023

Related U.S. Application Data

(63) Continuation of application No. 17/107,362, filed on Nov. 30, 2020, now Pat. No. 11,615,782.

(51) Int. Cl.
G10L 13/02 (2013.01)
G10L 15/06 (2013.01)
(52) U.S. Cl.
CPC ............ *G10L 15/063* (2013.01); *G10L 13/02* (2013.01)

(58) Field of Classification Search
None
See application file for complete search history.

(56) References Cited

U.S. PATENT DOCUMENTS

| | | | |
|---|---|---|---|
| 9,047,568 B1* | 6/2015 | Fisher | G06N 3/049 |
| 9,972,339 B1* | 5/2018 | Sundaram | G01S 3/8083 |
| 9,977,807 B1* | 5/2018 | Bowman | G06F 16/9027 |
| 10,761,809 B1* | 9/2020 | Peetermans | H03K 3/84 |
| 10,769,522 B2* | 9/2020 | Bhatt | G06N 3/08 |
| 10,930,263 B1* | 2/2021 | Mahyar | G10L 15/005 |
| 11,294,944 B2* | 4/2022 | Finch | G06F 40/232 |
| 11,361,763 B1* | 6/2022 | Maas | G10L 15/18 |
| 2003/0055614 A1* | 3/2003 | Pelikan | G06N 3/126 703/2 |
| 2007/0112545 A1* | 5/2007 | Barford | G06F 17/141 702/191 |
| 2008/0240566 A1* | 10/2008 | Thint | G06F 16/355 382/181 |
| 2009/0254971 A1* | 10/2009 | Herz | H04L 63/20 726/1 |

(Continued)

*Primary Examiner* — Jakieda R Jackson
(74) *Attorney, Agent, or Firm* — John L. Rogitz; John M. Rogitz

(57) ABSTRACT

Techniques are described for training neural networks on variable length datasets. The numeric representation of the length of each training sample is randomly perturbed to yield a pseudo-length, and the samples sorted by pseudo-length to achieve lower zero padding rate (ZPR) than completely randomized batching (thus saving computation time) yet higher randomness than strictly sorted batching (thus achieving better model performance than strictly sorted batching).

20 Claims, 6 Drawing Sheets

(56) References Cited

U.S. PATENT DOCUMENTS

| | | | | |
|---|---|---|---|---|
| 2012/0290521 A1* | 11/2012 | Frank | | G06N 20/00 |
| | | | | 706/45 |
| 2013/0173618 A1* | 7/2013 | Banville | | G06K 9/6253 |
| | | | | 707/736 |
| 2013/0232097 A1* | 9/2013 | Shiv | | G06N 3/08 |
| | | | | 706/20 |
| 2014/0177948 A1* | 6/2014 | Deolalikar | | G06F 16/285 |
| | | | | 382/159 |
| 2016/0071021 A1* | 3/2016 | Raymond | | G06F 15/76 |
| | | | | 712/28 |
| 2016/0275288 A1* | 9/2016 | Sethumadhavan | ... | H04L 9/3239 |
| 2016/0275289 A1* | 9/2016 | Sethumadhavan | | |
| | | | | H04L 63/0428 |
| 2017/0212210 A1* | 7/2017 | Chen | | G01S 5/0252 |
| 2017/0255872 A1* | 9/2017 | Hamze | | G06F 17/10 |
| 2019/0073590 A1* | 3/2019 | Wu | | G06N 3/045 |
| 2019/0250569 A1* | 8/2019 | Leonard | | G05B 15/02 |
| 2019/0294412 A1* | 9/2019 | Loh | | G06F 7/588 |
| 2019/0304596 A1* | 10/2019 | Padala | | G16H 40/20 |
| 2019/0385597 A1* | 12/2019 | Katsamanis | | G06N 3/04 |
| 2020/0097809 A1* | 3/2020 | Velasco | | G06N 3/048 |
| 2020/0175961 A1* | 6/2020 | Thomson | | G10L 15/28 |
| 2020/0285737 A1* | 9/2020 | Kraus | | G06F 21/552 |
| 2020/0285939 A1* | 9/2020 | Baker | | G06N 3/04 |
| 2020/0327252 A1* | 10/2020 | McFall | | G06F 21/78 |
| 2020/0372352 A1* | 11/2020 | Deng | | G06N 3/045 |
| 2020/0387563 A1* | 12/2020 | Joshi | | G06F 17/16 |
| 2021/0067344 A1* | 3/2021 | Drake | | H04L 9/0643 |
| 2021/0081755 A1* | 3/2021 | Li | | G06N 3/04 |
| 2021/0158799 A1* | 5/2021 | Zhang | | G10L 15/20 |
| 2021/0192136 A1* | 6/2021 | Sar Shalom | | G06F 16/3329 |
| 2021/0357433 A1* | 11/2021 | Ganguly | | G06N 20/00 |
| 2021/0383871 A1* | 12/2021 | Berman | | G11C 16/10 |
| 2022/0114014 A1* | 4/2022 | Chen | | G06F 9/5027 |
| 2022/0121709 A1* | 4/2022 | Lehmann | | G06F 16/3331 |
| 2022/0147817 A1* | 5/2022 | Boardman | | G06Q 10/0635 |

* cited by examiner

SEMI-SORTED BATCHING WITH VARIABLE LENGTH INPUT FOR EFFICIENT TRAINING

FIELD

The application relates generally to technically inventive, non-routine solutions that are necessarily rooted in computer technology and that produce concrete technical improvements. In particular, the present application relates to techniques for training machine learning neural networks.

BACKGROUND

Machine learning (ML) models are used for recognizing patterns in variable length data for, e.g., deriving text from variable length speech inputs (Automatic Speech Recognition (ASR) with waveforms), natural language processing in which prediction of a next word in a phrase is sought, and speech synthesis (from text to speech).

Such models must be trained using sequential training data with temporal information. The word "sequential" means the predicted outcome will be determined from not only the current data but also previous data. Random batching is commonly used as a default batching strategy for sequential model training with variable length training data. However, the Zero-Padding Rate (ZPR) is relatively high. ZPR refers to the need to append zeros to shorter samples to ensure all the data have the same length for efficient training, with ZPR being a ratio of total number of zeros added in vs. total sample length after padding. As understood herein, a high ZPR comes with increase of the considerable computational cost.

To reduce ZPR, as an alternative to random batching, samples can be sorted by length before batching rather than ordering them randomly. As recognized herein, while this reduces ZPR, it also removes the data randomness completely, which is not good for model learning and accuracy improvement.

SUMMARY

Present principles add to the real length of variable length training samples a random length perturbation for sorting the samples, without which only the strictly sorted samples discussed above can be obtained. The resulting sample sequence contains real samples with real length. In this way, samples are sorted by a randomized pseudo-length while maintaining a degree of randomness in the lengths in each batch.

This technique is referred to herein as semi-sorted batching, which balances between the reduction of ZPR (for better training speed) and randomness of the data (for maintaining similar model performance, compared with random batching). This batching method is beneficial for any sequential model training as long as the input samples have variable lengths. Semi-sorted batching also provides a parameter that can be used to tune the randomness level, which can help to find a "sweet spot" between random batching and strictly sorted batching, where the model training efficiency and training randomness are well-balanced.

Moreover, unlike bucket batching (in which samples are first sorted and then divided into different buckets, with a bucket size being a multiple of batch size) and alternated-sorting batching (in which samples are first divided into bins, then the samples inside each bins are alternated sorted with odd bins being ascendingly sorted and even bins, descendingly sorted), present techniques do not require two steps, but only one step to sort the samples into batches by randomly perturbated lengths.

Accordingly, a device includes at least one computer storage that is not a transitory signal and that in turn includes instructions executable by at least one processor to randomly perturb respective numeric representations of lengths of respective machine learning (ML) training samples to establish respective pseudo-lengths. The instructions are executable to sort the ML training samples by pseudo-length, and train at least one ML model by inputting batches of ML training samples derived from the sort of the ML training samples. Note that present sorting techniques also may be used in the testing (inferencing) and validation phases.

In example embodiments the instructions are executable to randomly perturb respective numeric representations of lengths of at least some of the ML training samples. If desired, the instructions can be executable to randomly perturb respective numeric representations of lengths of all of the ML training samples.

In implementations discussed herein the ML training samples have variable lengths. By way of example, the ML samples can include variable length waveforms, and the ML model can be configured for Automatic Speech Recognition (ASR). Or, the ML samples can include variable length phrases, and the ML model can be configured for natural language processing. Yet again, the ML samples can include variable length text strings and variable length waveforms together, and the ML model can be configured for speech synthesis training. During the training of TTS, the waveforms are required, during the inference, only text is required. Combinations of the above may be implemented.

In example embodiments the instructions may be executable to randomly perturb the respective numeric representations of lengths at least in part by adding a respective randomized value to each respective numeric representation. In some implementations each randomized value can be randomly selected from a distribution of values between minus one-half of a difference between a longest sample length and a shortest sample length from among the ML samples and plus one-half of the difference between the longest sample length and the shortest sample length. If desired, the distribution may be multiplied by a randomization factor. The distribution of values can have a mean of zero and may be a uniform distribution.

In another aspect, a method includes randomly perturbing real lengths of variable-length training samples to render pseudo-lengths. The method further includes arranging the variable-length training samples using the pseudo-lengths to render an arrangement of variable-length training samples, and training at least one machine learning (ML) model using the arrangement of variable-length training samples.

In another aspect, an apparatus includes at least one processor adapted to arrange plural variable length samples by respective lengths based on respective combinations of real sample lengths and randomized lengths. The processor is adapted to input to at least one neural network the variable length samples arranged by their respective lengths in a training phase, an inferencing phase, a validation phase, or any combination of testing, inferencing, and validation. The processor is further adapted to execute the at least one neural network based at least in part on the samples.

The details of the present application, both as to its structure and operation, can best be understood in reference to the accompanying drawings, in which like reference numerals refer to like parts, and in which:

DETAILED DESCRIPTION

Figure 1:
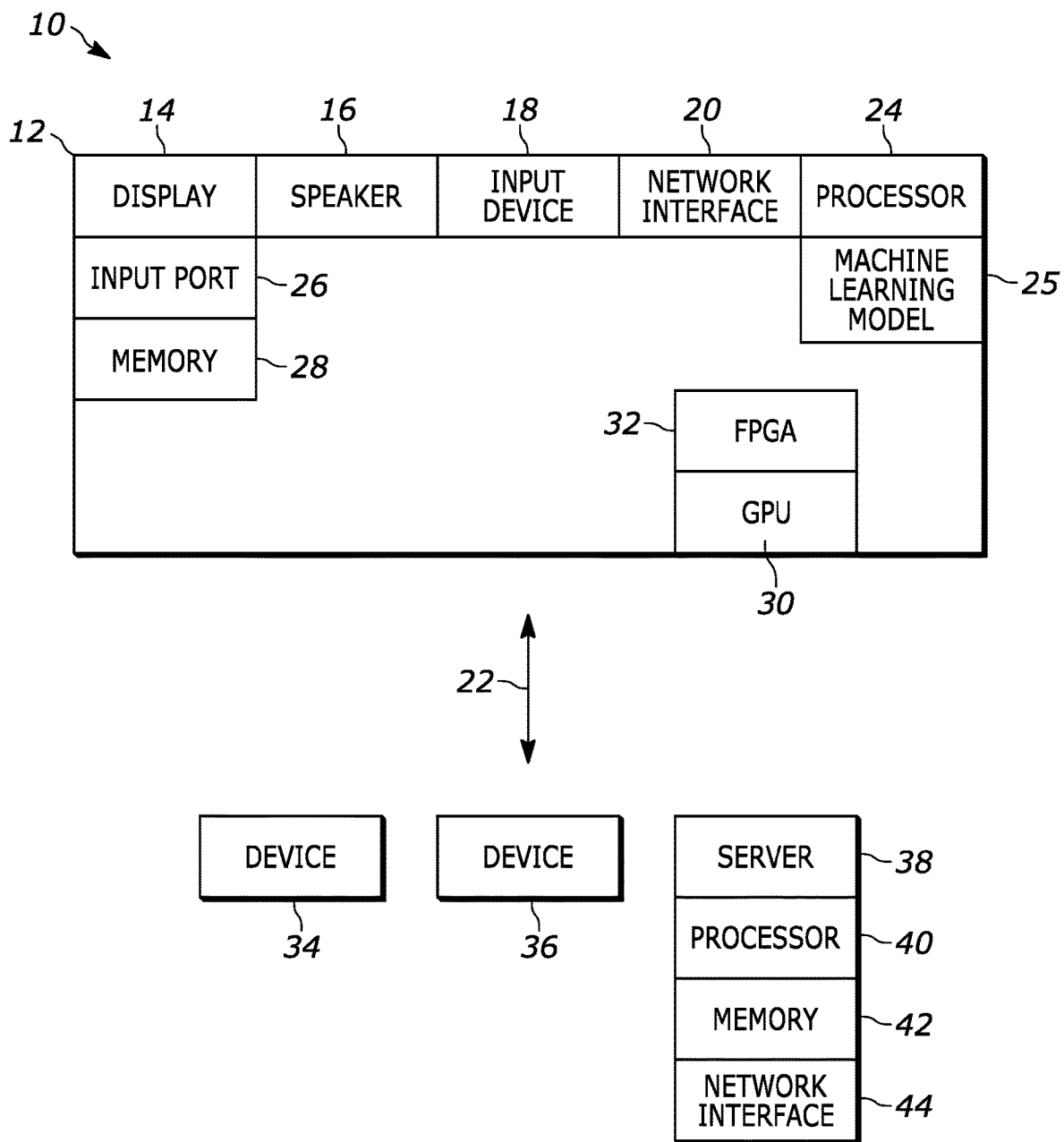
FIG. 1 is a block diagram of an example system consistent with present principles.

Now referring to FIG. 1, this disclosure relates generally to computer ecosystems including aspects of computer networks that may include computer devices such as but not limited to consumer electronics (CE) devices. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below.

Servers and/or gateways may include one or more processors executing instructions that configure the servers to receive and transmit data over a network such as the Internet. Or a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security.

As used herein, instructions refer to computer-implemented steps for processing information in the system. Instructions can be implemented in software, firmware or hardware and include any type of programmed step undertaken by components of the system.

A processor may be a general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library. While flow chart format may be used, it is to be understood that software may be implemented as a state machine or other logical method.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general-purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. Note that computerized devices described in the figures herein may include some or all of the components set forth for various devices in FIG. 1.

The first of the example devices included in the system 10 is a computer 12 which, like other computers described herein, is configured to undertake present principles (e.g. communicate with other computer devices to undertake present principles, execute the logic described herein, and perform any other functions and/or operations described herein).

Accordingly, to undertake such principles the computer 12 can be established by some or all of the components shown in FIG. 1. For example, the computer 12 can include one or more displays 14 that may be implemented by a high definition or ultra-high definition "4K" or higher flat screen and that may or may not be touch-enabled for receiving user input signals via touches on the display. The computer 12 may also include one or more speakers 16 for outputting audio in accordance with present principles, and at least one additional input device 18 such as e.g. an audio receiver/microphone for e.g. entering audible commands to the computer 12 to control the computer 12. The example computer 12 may further include one or more network interfaces 20 for communication over at least one network 22 such as the Internet, other wide area network (WAN), a local area network (LAN), a personal area network (PAN), etc. under control of one or more processors 24. Thus, the interface 20 may be, without limitation, a Wi-Fi transceiver, which is an example of a wireless computer network interface, such as but not limited to a mesh network transceiver. The interface 20 may be, without limitation a Bluetooth transceiver, Zigbee transceiver, IrDA transceiver, Wireless USB transceiver, wired USB, wired LAN, Powerline or MoCA. It is to be understood that the processor 24 controls the computer 12 to undertake present principles, including the other elements of the computer 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

The processor 24 can access one or more machine learning (ML) models 25 such as but not limited to one or more neural networks consistent with present principles.

In addition to the foregoing, the computer 12 may also include one or more input ports 26 such as, e.g., a high definition multimedia interface (HDMI) port or a USB port to physically connect (e.g. using a wired connection) to another computer device and/or a headphone port to connect headphones to the computer 12 for presentation of audio from the computer 12 to a user through the headphones. The computer 12 may further include one or more computer memories 28 such as disk-based or solid-state storage that are not transitory signals, in some cases embodied in the chassis of the computer as standalone devices or as a personal video recording device (PVR) or video disk player either internal or external to the chassis of the computer or as removable memory media. Also, in some embodiments, the computer 12 can include a graphics processing unit (GPU) 30 and/or a field-programmable gate array (FPGA) 32. The GPU and/or FPGA may be used by the computer 12 for, e.g., artificial intelligence processing such as training neural networks and performing the operations (e.g., inferences) of neural networks in accordance with present principles. However, note that the processor 24 may also be used for artificial intelligence processing such as where the processor 24 might be a central processing unit (CPU).

Still referring to FIG. 1, in addition to the computer 12, the system 10 may include one or more other computer device types that may include some or all of the components shown for the computer 12. In one example, a first device 34 and a second device 36 are shown and may include similar components as some or all of the components of the computer 12. Fewer or greater devices may be used than shown.

The system 10 also may include one or more servers 38. A server 38 may include at least one server processor 40, at least one computer memory 42 such as disk-based or solid state storage, and at least one network interface 44 that, under control of the server processor 40, allows for communication with the other devices of FIG. 1 over the network 22, and indeed may facilitate communication between servers, controllers, and client devices in accordance with present principles. Note that the network interface 44 may be, e.g., a wired or wireless modem or router, Wi-Fi transceiver, or other appropriate interface such as, e.g., a wireless telephony transceiver.

Accordingly, in some embodiments the server 38 may be an Internet server and may include and perform "cloud" functions such that the devices of the system 10 may access a "cloud" environment via the server 38 in example embodiments. Or the server 38 may be implemented by a game console or other computer in the same room as the other devices shown in FIG. 1 or nearby.

The devices described below may incorporate some or all of the elements described above.

Figure 2:
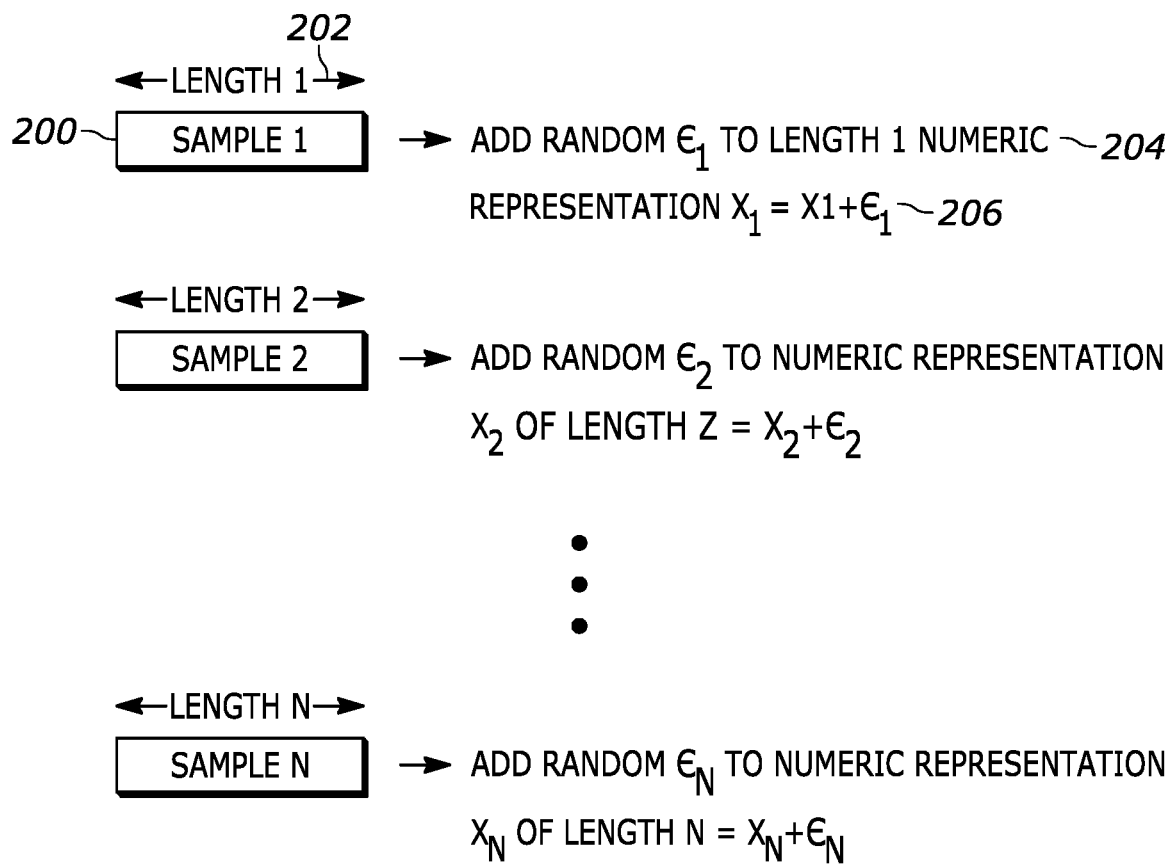
FIG. 2 illustrates machine learning (ML) variable length training samples along with randomly perturbing numeric representations of the lengths of the samples for sorting.

FIG. 2 illustrates a series of variable length ML engine training samples 200, shown in FIG. 1 for simplicity as sample 1, sample 2, . . . , sample N, such that a sample may be denoted by a subscript "i" with "i" indicating the sample from $sample_1$ to $sample_N$. Without limitation, the samples 200 may be, e.g., variable length waveforms to train the ML model 25 in FIG. 1 for Automatic Speech Recognition (ASR), or variable length phrases to train the ML model for natural language processing, or variable length text strings to train the ML model for speech synthesis.

Each respective $sample_i$ 200 has a respective $length_i$ 202, in some cases temporally expressed such as seconds of a training recording or spatially expressed such as a number of text words or letters to convert to synthesized speech. In any case, the $lengths_i$ can be represented by numerical values, herein denoted $x_i$. Each numerical value of length is randomly perturbed by adding to that length a negative or positive random value 204, herein denoted $\varepsilon_i$, to render a pseudo-length 206.

Figure 3:
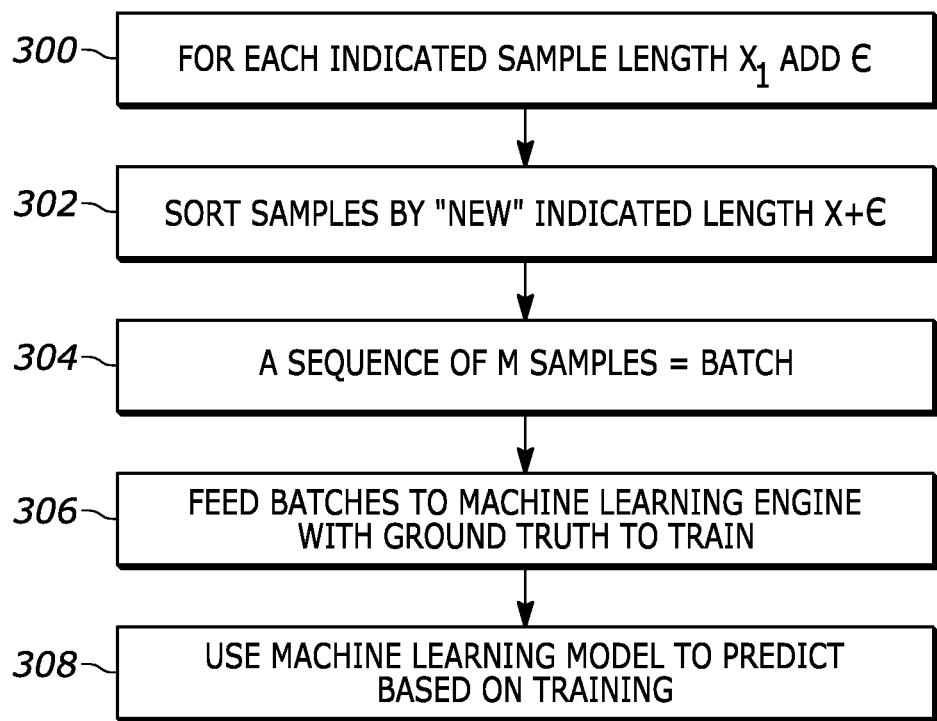
FIG. 3 illustrates example logic consistent with present principles in example flow chart format.

FIG. 3 illustrates further. Commencing at block 300, respective numeric representations of lengths of respective machine learning (ML) training samples 200 are randomly perturbed to establish respective pseudo-lengths. In an implementation, this is done by randomly selecting a respective random value 204 for each sample 200 and adding that random value 204 to the respective real length 202 of the sample.

Proceeding to block 302, the samples are sorted by their respective pseudo-lengths, which produces at block 304 sequences of M samples, wherein M is an integer less than N (total number of samples), to establish plural batches of samples that are provided to a ML model or engine for training at block 306. The batches are thus derived from the sort of the ML training samples based on pseudo-length. The samples in each batch retain their original data and original real lengths; the pseudo-lengths are used only for sorting the samples. Some or all of the samples may be perturbed as described. Substantially all samples, e.g., at least 90%, may be perturbed as described. Note that in sorting the samples by pseudo-length, a degree of randomization is inherently attained at sort time, and there is thus no need for an additional step such as binning (which must be done in strictly sorted batching) or bucketing (which must be done in randomized batching). The trained ML model is then used at block 308 to render relevant predictions from non-training data based on the training at block 306.

In example embodiments, each randomized value can be randomly selected from a distribution of values between minus one-half of a difference between a longest sample length and a shortest sample length from among the samples and plus one-half of the difference between the longest sample length and the shortest sample length. Furthermore, the distribution of values may be multiplied by a randomization factor to "tune" the technique to optimize the tradeoff between reducing ZPR and attaining adequate randomization. This is mathematically symbolized below.

It may now be appreciated, compared with strictly sorted batching, present semi-sorted batching (SSB) perturbs sample lengths by adding a randomized length $\varepsilon_i$ to sample length $x_i$ when sorting. The randomized length $\varepsilon_i$ is a random variable uniformly distributed within (−a/2, a/2), where a is a bound determined by the difference between the lower and upper bound of sample lengths (longest and shortest sample lengths) and a Local Randomization Factor (LRF) $r \in [0, \infty)$:

$$\begin{cases} x_i' = x_i + \varepsilon_i, \text{ where} \\ \varepsilon_i \sim U\left(-\frac{a}{2}, \frac{a}{2}\right), a = (\max x_i - \min x_i) \cdot r \end{cases}$$

The symbol "U" in the above equation indicates that the distribution is a uniform distribution. A Gaussian distribution of $\varepsilon_i$ alternatively may be used, or in general any distribution with a mean of zero. By tuning r from 0 to ∞, the randomness in SSB is in between the randomness in SB (r=0) and the randomness in random batching (r=∞). In practice, the randomization factor r may only require tuning between zero and one.

Figure 4:
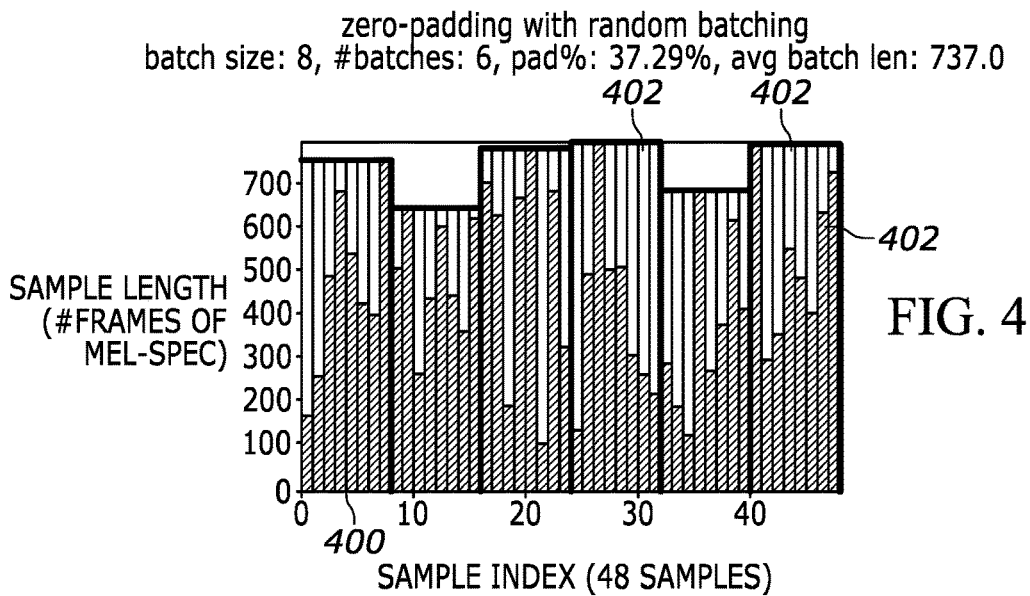
FIGS. 4 and 5 illustrate sequences of training samples sorted completely randomly (FIG. 4, batch sorting) and completely sorted (FIG. 5), for comparison with the semi-sorted sequence of FIG. 6 consistent with present principles.
Figure 5:
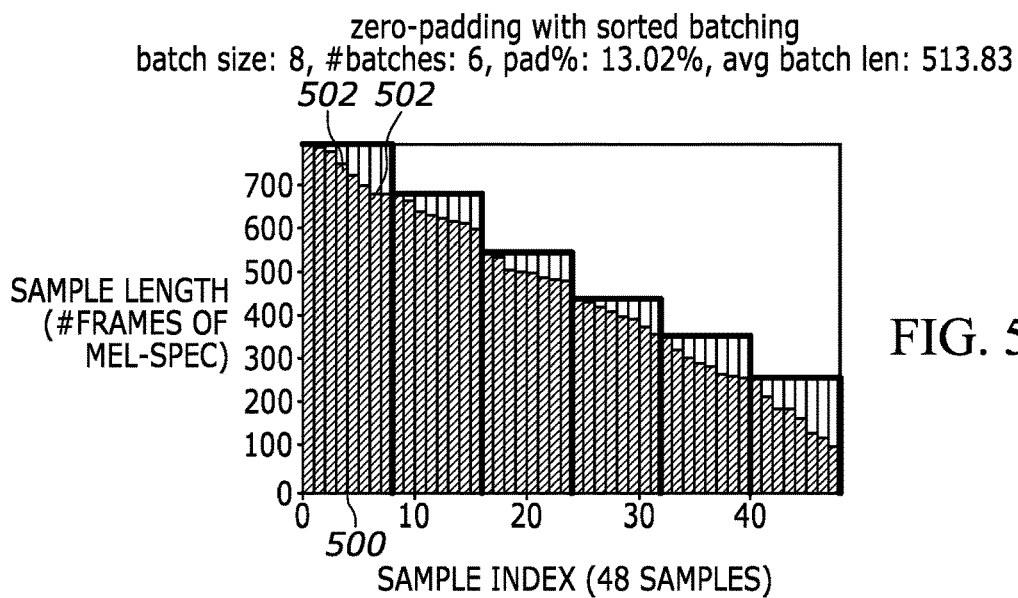
Figure 6:
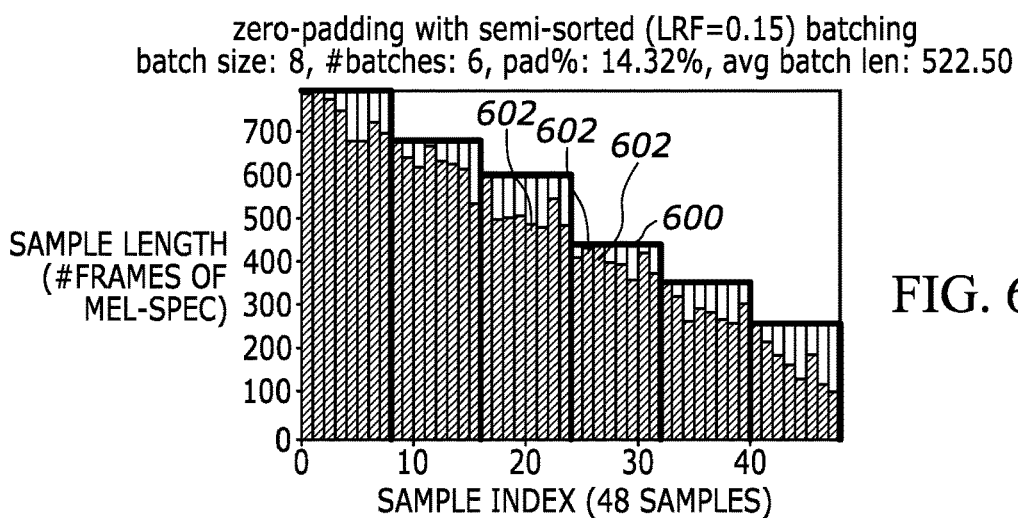

FIGS. 4-6 illustrate further. FIG. 4 illustrates randomized batching in which batches 400 contain samples 402 of any length, with length reflected on the y-axis. FIG. 5 illustrates the outcome of strictly sorted batching, in which batches 500 of samples 502 contain samples of monotonically decreasing lengths from longest to shortest length. It can also be sorted from shortest to longest length, but it should be better to sort descendingly, since putting the batch with longest length up front, will test the capacity of the computer early to assure the later training will be fine if the first batch is successfully processed.

In contrast, FIG. 6 illustrates the outcome of instant techniques, in which batches 600 contain samples 602 that, while not completely randomized as in FIG. 4 and while generally decreasing in length along the x-axis, do not monotonically decrease from longest to shortest. This is because the samples are not sorted by their real lengths, which are shown in FIG. 6, but by their pseudo-lengths.

Figure 7:
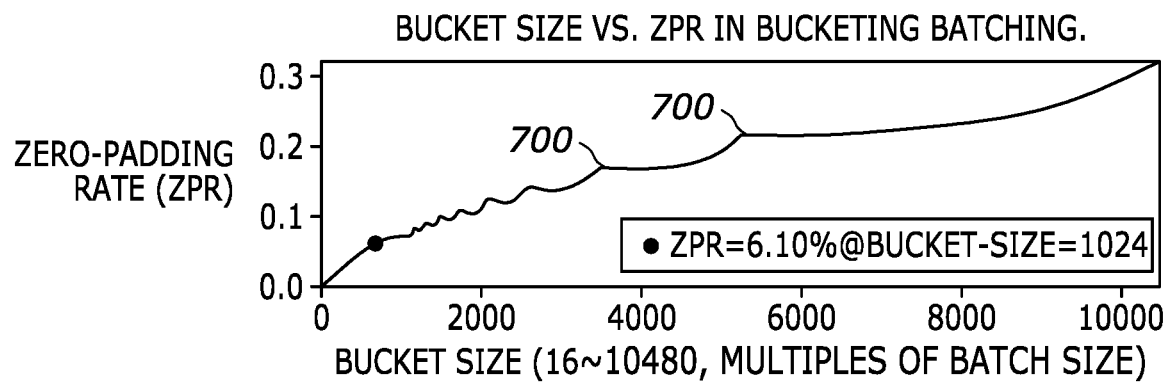
FIGS. 7 and 8 illustrate curves of ZPR for, respectively, bucket and sorted batching, for comparison with the smoother curve for semi-sorted batching shown in FIG. 9.
Figure 8:
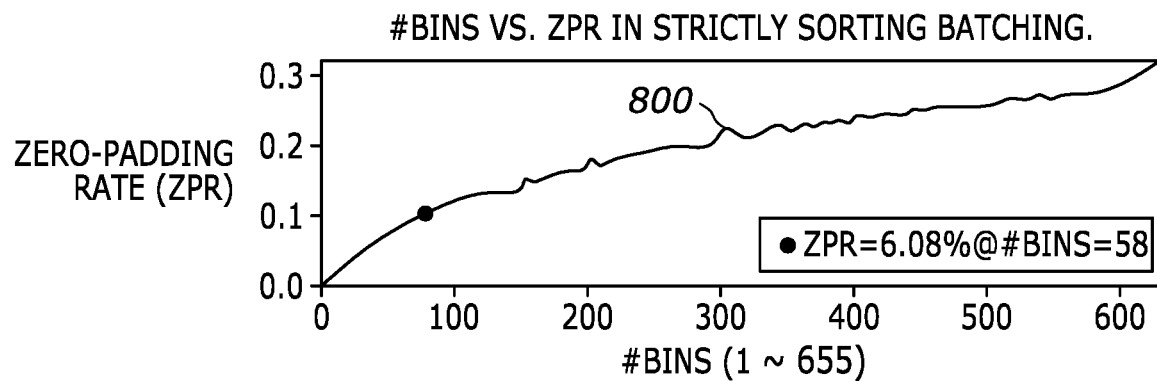

FIG. 7 illustrates bucket size on the x-axis versus ZPR on the y-axis for randomized batching, in which discontinuities 700 occur. FIG. 8 similarly illustrates number of bins versus ZPR for strictly sorted batching, also exhibiting discontinuities 800.

Figure 9:
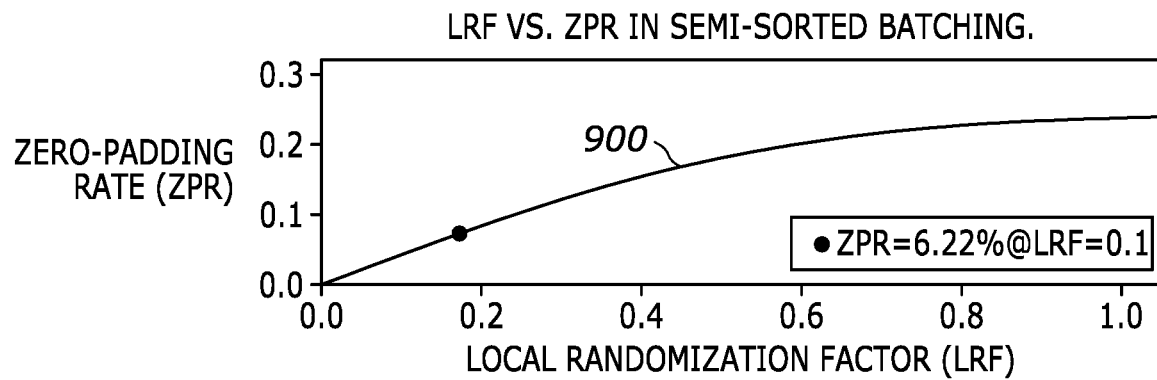

In contrast, FIG. 9 illustrates the randomization factor "r" discussed above versus ZPR, showing an advantageously smooth curve 900. This illustrates that the randomness level with respect to the curve of ZPR using the tuning parameter "r" in semi-sorted batching allows smoother tuning of randomness level than is provided by randomized batching and strictly sorted batching.

Figure 10:
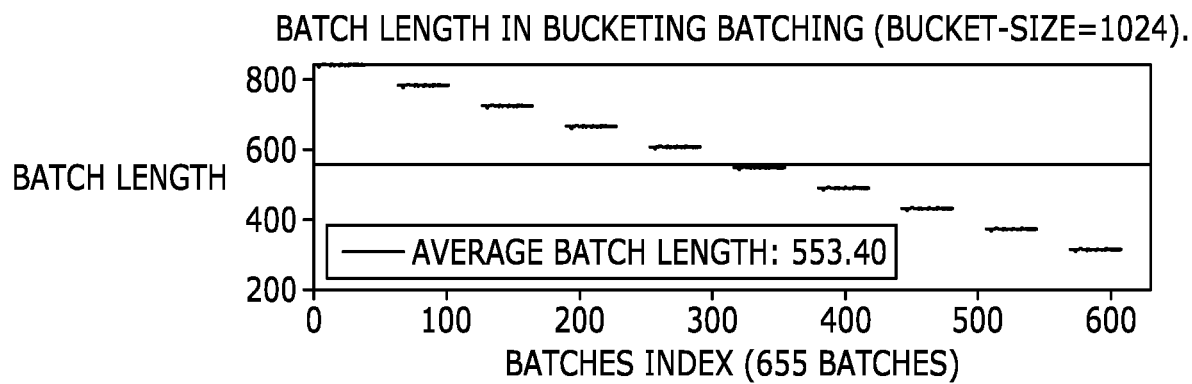
FIGS. 10 and 11 illustrate batch length for, respectively, bucket and sorted batching, for comparison with semi-sorted batching shown in FIG. 12.
Figure 11:
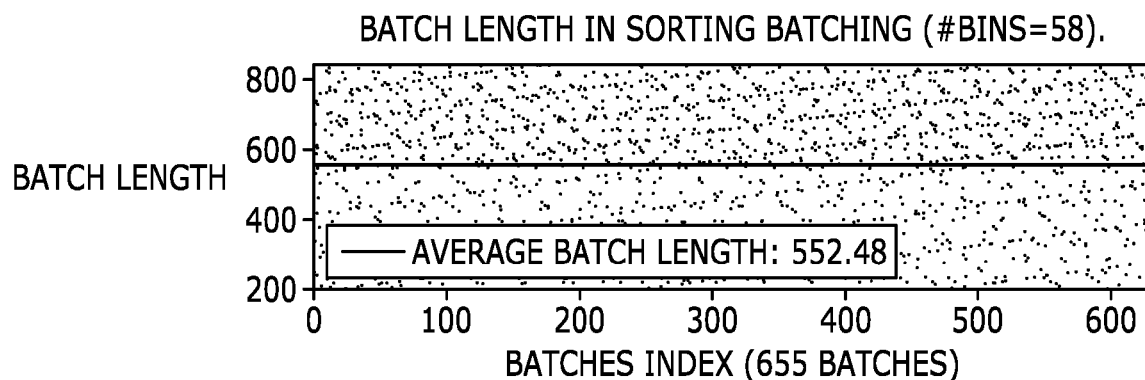
Figure 12:
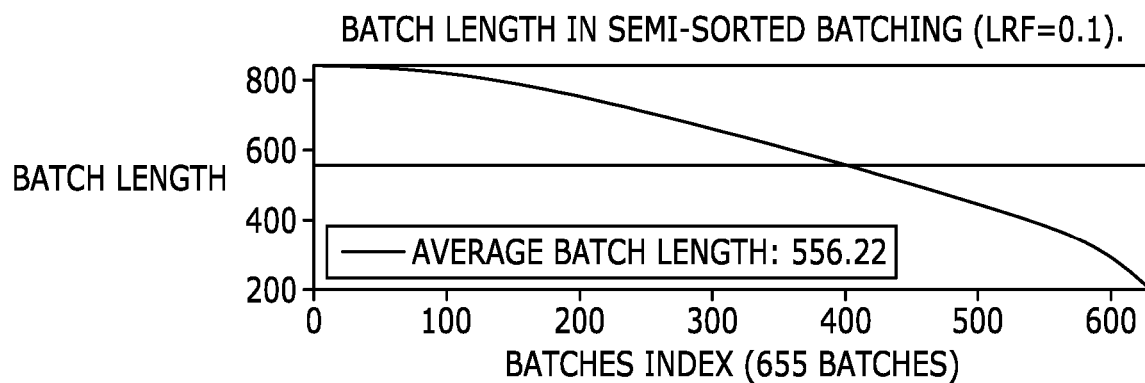

FIGS. 10-12 show on the y-axis the corresponding batch lengths of, respectively, randomized batching, strictly sorted batching, and the instant semi-sorted batching versus number of batches on the x-axis when the tuning parameters (randomization function "r" for semi-sorted batching, bucket size for randomized batching, and number of bins for strictly sorted batching) have approximately the same randomness level (similar ZPR and average batch length).

Note that the instant batching algorithm can be used to save time not only during training but also to save time during testing (inferencing.) Essentially, if batching is required of a group of samples for efficient computation, the present batching algorithm will save time compared with the random batching.

For instance, during testing (or inferencing), although one sample at a time may be tested (e.g., input one sentence to the model, then the model will produce the synthesized waveform for the sentence), if there are many sentences (or texts) to be inferenced, the instant batching techniques may be used to produce the output waveform batch by batch.

In the case of validation (testing during training) a validation dataset is tested once per checkpoint and can give feedback on the performance of the current checkpoint model. This validation set contains many samples that can be batched according to present principles and input to the ML model.

It will be appreciated that whilst present principals have been described with reference to some example embodiments, these are not intended to be limiting, and that various alternative arrangements may be used to implement the subject matter claimed herein.

What is claimed is:

1. A device comprising:
at least one computer storage that is not a transitory signal and that comprises instructions executable by at least one processor to:
randomly perturb respective numeric representations of lengths of respective machine learning (ML) training samples to establish respective pseudo-lengths;
sort the ML training samples by pseudo-length; and
train at least one ML model by inputting the ML training samples to the ML model.

2. The device of claim 1, wherein the instructions are executable to randomly perturb respective numeric representations of lengths of at least some of the ML training samples.

3. The device of claim 1, wherein the instructions are executable to randomly perturb respective numeric representations of lengths of all of the ML training samples.

4. The device of claim 1, wherein the ML training samples have variable lengths.

5. The device of claim 4, wherein the ML samples comprise variable length waveforms, and the ML model is configured for Automatic Speech Recognition (ASR).

6. The device of claim 4, wherein the ML samples comprise variable length phrases, the ML model is configured for natural language processing.

7. The device of claim 4, wherein the ML samples comprise variable length text strings, and the ML model is configured for speech synthesis.

8. The device of claim 1, wherein the instructions are executable to randomly perturb the respective numeric representations of lengths at least in part by adding a respective randomized value to each respective numeric representation.

9. The device of claim 8, wherein each randomized value is randomly selected from a distribution of values between minus one-half of a difference between a longest sample length and a shortest sample length from among the ML samples and plus one-half of the difference between the longest sample length and the shortest sample length.

10. The device of claim 9, wherein each randomized value is randomly selected from the distribution of values between minus one-half of the difference between the longest sample length and the shortest sample length and plus one-half of the difference between the longest sample length and the shortest sample length, multiplied by a randomization factor.

11. The device of claim 9, wherein the distribution of values has a mean of zero.

12. The device of claim 11, wherein the distribution is a uniform distribution.

13. The device of claim 1, comprising the at least one processor executing the instructions.

14. A method, comprising:
randomly perturbing real lengths of training samples to render pseudo-lengths;
arranging the training samples using the pseudo-lengths to render an arrangement of training samples; and
training at least one machine learning (ML) model using the arrangement of training samples.

15. The method of claim 14, comprising using the ML model to render predictions from non-training data.

16. The method of claim 14, wherein the variable-length training samples comprise variable length waveforms, and the ML model is configured for Automatic Speech Recognition (ASR).

17. The method of claim 14, wherein the variable-length training samples comprise variable length phrases, the ML model is configured for natural language processing.

18. The method of claim 14, wherein the variable-length training samples comprise variable length text strings, and the ML model is configured for speech synthesis.

19. An apparatus, comprising:
at least one processor adapted to:
arrange plural samples by respective lengths based on respective combinations of real sample lengths and randomized lengths;
input to at least one neural network the samples arranged by their respective lengths in a training phase, an inferencing phase, a validation phase, or any combination of testing, inferencing, and validation; and
execute the at least one neural network based at least in part on the samples.

20. The apparatus of claim 19, wherein the at least one processor is adapted to render the respective lengths at least in part by adding to each real sample length $x_i$ a respective randomized length $\varepsilon_i$ which is a random variable uniformly distributed within $(-a/2, a/2)$, where a is a bound determined by a difference between a lower and upper bound of sample lengths and a randomization factor $r \in [0, \infty)$, wherein $$\begin{cases} x'_i = x_i + \varepsilon_i, \text{ where} \\ \varepsilon_i \sim U\left(-\frac{a}{2}, \frac{a}{2}\right), a = (\max x_i - \min x_i) \cdot r \end{cases}.$$

* * * * *